Oct. 23, 1962 D. O. CLAYDEN 3,059,850
CONTROL ARRANGEMENTS FOR ELECTRICAL DIGITAL COMPUTING ENGINES
Filed Aug. 20, 1958
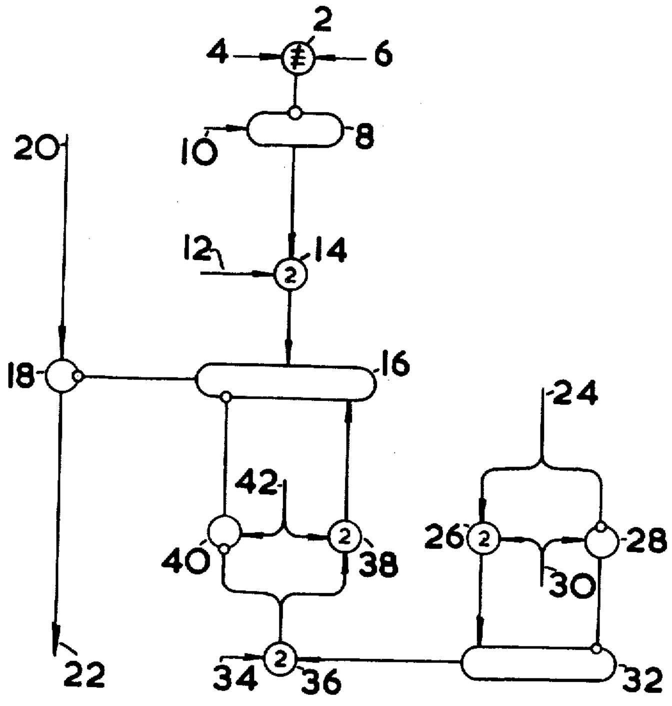
DAVID OSWALD CLAYDEN
*Inventor*
By Cushman, Darby & Cushman
*Attorneys*

3,059,850

CONTROL ARRANGEMENTS FOR ELECTRICAL DIGITAL COMPUTING ENGINES

David Oswald Clayden, Heston, England, assignor to National Research Development Corporation, London, England, a British corporation Filed Aug. 20, 1958, Ser. No. 756,092
Claims priority, application Great Britain Aug. 22, 1957
2 Claims. (Cl. 235—157)

The present invention relates to electrical digital computing engines. Quite a large amount of time is spent at these engines in the testing of programmes, and a frequent requirement in programme testing is the stopping of a machine at a predetermined point in a programme. The easiest way to do this is to stop the engine when a given instruction word is reached, and the present invention describes means for doing this.

According to the present invention there is provided an electrical digital computing engine constructed to use instruction words and including means for detecting a coincidence between digits of an instruction word in a programme and preselected digits and means for interrupting the programme when such a coincidence occurs.

The present specification uses the well-known Turing notation as described in patent specification No. 2,686,632.

An embodiment of the invention will be more particularly described by way of example with reference to a serial computing engine having delay-line storage and using a three-address instruction word, and with reference to the accompanying drawing which is a circuit diagram of part of such an engine.

The invention is not limited to this restricted class of computing engines, however, as will become clear from the following description of the embodiment.

The operation of the circuit will now be described. The computing engine uses an instruction word of the following form:

"Wait until time W and then carry out a transfer X and take the next instruction from source N at time T."

The instruction word can properly be divided into two parts: the part which refers to the present transfer, and the part which refers to the next instruction. These parts will be referred to below as the W and X part and the N and T part. It is arranged that the W and X part of the instruction word is made available before the N and T part.

It is assumed that it is required to carry out a programme on an engine of this kind, and that it is required to stop the engine at a particular instruction word in order to inspect the contents of the engine. The individual digits of this particular instruction word are set up on switches, call Stop Switches, in the engine, and when the instruction word is reached the engine stops in a manner to be described.

For convenience it is arranged that the engine can stop on either of the two parts of the instruction word mentioned above; that is to say: the engine will stop if the W and X parts of the instruction word referred to above corresponds to the condition of the W and X switches, notwithstanding the fact that the N and T switches do not correspond, or are not even set at all; and the same applies, mutatis mutandi, to the N and T part of the instruction word.

When the engine is stopped on the W and X part of the instruction word it will not carry out the instruction specified by the instruction word, but, in a machine having an instruction word staticisor, the instruction word will be staticised for inspection purposes.

When, on the other hand, the engine is stopped on the N and T part of the instruction word it will execute the transfer specified by the instruction word and will set up the new instruction word specified (by the N and T part of the instruction word) but will not execute the transfer specified by the new instruction word.

The drawing shows a not-equivalent gate 2 with inputs 4 and 6. The output of the not-equivalent gate 2 is fed to the "off" input of a trigger 8. The trigger is put on by a signal on an input channel 10. The output of the trigger is sent, together with a signal on an input channel 12, to an AND-gate 14, whose output is sent to a trigger 16.

An inhibiting gate 18 has an input 20 and an output 22; its inhibiting input is the output of the trigger 16.

Signals on a channel 24 are sent to an AND-gate 26 and to the inhibiting input of an inhibiting gate 28. The other signals to the gates 26 and 28 travel in a channel 30. The outputs of the gates 26 and 28 are applied respectively to the "on" and "off" inputs of a trigger 32, whose output is fed, together with signals on a channel 34, to an AND-gate 36. The output of the gate 36 is applied to an AND-gate 38 and to the inhibiting input of an inhibiting gate 40. The outputs of these gates are arranged to put on and to put off, respectively, the trigger 16. Signals on a channel 42 are sent to the gates 38 and 40.

The operation of the circuit is as follows. The digits of the W and X part of the instruction word set up on the Stop Switches are dynamicised (for example, in the way described in patent specification No. 2,686,632), and compared, one by one, with the digits of the current instruction word at the gate 2. The dynamicised word from the Stop Switches may arrive via the channel 4 and the current instruction word may arrive via the channel 6. If the two words are the same, then the not-equivalent gate 2 will give no output, but if there is any discrepancy, the gate 2 will give an output, putting off the trigger 8, which is arranged to have previously been put on via the channel 10. Thus at the conclusion of this comparison process, which stops at the end of the time during which the W and X part of the instruction are made available, the trigger 8 will be on if and only if the W and X part of the instruction corresponds precisely with the W and X part of the word set up on the Stop Switches. When the two W and X parts have been compared in this way a pulse appears on the channel 12 and puts on the trigger 16 via the gate 14 only if the trigger 8 is on, that is, only if the engine is required to stop. The effect of the trigger 16 is to close the gate 18.

Towards the end of the minor cycle before the minor cycle specified by the W and X part of the instruction word, that is, towards the end of the $(W-1)$ minor cycle, a "ready" signal is generated which prepares the engine for the transfer X specified. The "ready" signal appears on the channel 20 and prepares the engine via the channel 22. If the gate 18 is closed the "ready" signal will not be able to prepare the engine and so the transfer will not take place. The "ready" signal will appear in the $(W-1)$ minor cycle of each major cycle until it is allowed through the gate 18 by the putting off of the trigger 16, and when a "ready" signal appears eventually on the channel 22, the transfer will take place.

When an instruction word the N and T part of which corresponds to the positions of the Stop Switches is reached, the procedure is more complicated, since the N and T part of the instruction word are only made available towards the end of the minor cycle. Whenever the N part of the instruction word corresponds to the N Stop Switches a signal is generated on the channel 24, in the same way as the signal on the channel emerging from the gate 14 was generated. For example, the digits of the N part of the instruction word set up on the Stop Switches may be dynamicized (for example, in the way described in U. S. Patent 2,686,632), and compared, one by one, with the corresponding digits of the current instruction word at a not-equivalent gate (not shown). If the two words are the same the not-equivalent gate will give no output, but if there is any discrepancy, it will give an output, to put off a trigger (not shown) which is arranged to have previously been put on. Thus if, and only if, the end part of the instruction word corresponds precisely with the corresponding digits set up on the Stop Switches, the trigger will emit a signal. This signal prevents pulses on the channel 30 from holding off the trigger 32, by inhibiting the gate 28, and allows such a pulse to put on the trigger 32, by opening the gate 26. A pulse is arranged to recur on the channel 30 towards the end of every minor cycle.

Thus a signal appears at the gate 36, which is opened by a pulse, on the channel 34, which occurs when the T part of the instruction word corresponds to the T Stop Switches. (The way this is arranged is described below.) The signal emitted by the gate 36 prevents pulses on the channel 42 from holding off the trigger 16, by inhibiting the gate 40, and allows such a pulse to put on the trigger 16, by opening the gate 38. A pulse is arranged to recur on the channel 42 at the end of each minor cycle, i.e., just after the pulse on the channel 30. The signal generated by the trigger 16 inhibits the "ready" signal at the gate 18, as before.

In a computing engine in which the instruction word is staticised it is convenient to arrange the pulses on the channel 42 to be the pulses which clear the instruction staticisor.

Many computing engines are arranged to use a discrimination order of the sort:

"If condition K holds then take the next instruction from source N at time T; otherwise take the next instruction from source N at time $T+1$."

Such a facility is described in, for example, copending application Serial No. 290,014 filed May 26, 1952, by E. A. Newman, D. W. Davis, and D. O. Clayden, now Patent No. 2,891,723.

If, in a computing engine having this facility, it is required to stop the engine (in the manner described above) on the instruction word specifying next instruction source N and next instruction time $T+1$, a difficulty arises, since the staticised instruction word only gives N and T (and the second part of the discrimination instruction quoted above is obtained by leaving the instruction source gates open for a second minor cycle, the $T+1$ minor cycle). Because of this difficulty the T switches are compared, not with the T part of the instruction staticisor, but with a minor cycle counter giving the current minor cycle number. For example, this digits of the T part of the instruction word set up on the Stop Switches and the output of the minor cycle counter may each be dynamicized (for example in the way described in patent specification No. 2,686,632) and compared, one by one, with the corresponding digits of the current instruction word at a not-equivalent gate (not shown). If the two words are the same, the not-equivalent gates will give no output, but if there is any discrepancy, it will give an output to put off a trigger (not shown) which is arranged to have been previously put on. Thus if, and only if, the output of the minor cycle counter corresponds precisely with the digits of the T part of the instruction word set up on the Stop Switches, the trigger will emit a signal. This signal may be conveyed to the channel 34.

For a timing chart we show a sample operation on a computing engine of the most elementary kind having an instruction word and minor cycles each of 8 binary digits, two digits being assigned to each of the W, X, N and T parts of the instruction word. This is easily applicable to more complex engines as any competent practitioner in the art will know. Let us deal with part of minor cycle 00, minor cycle 10 and minor cycle 01 (less significant digits on the left). Then the parts of the instruction word will emerge as follows:

| 00 | 10 | | | | 01 | | | |
|---|---|---|---|---|---|---|---|---|
| T | W | X | N | T | W | X | N | T |

where the minor cycle numbers are written at the beginning of each minor cycle. For stopping on the W and X part of the instruction word, let the number on the Stop Switches be 1 1 1 0 0 1 1 0 1 1 1 0 0 1 1 0 this is repeated to be in both minor cycles 10 and 01. Let consecutive instruction words be 0 1 1 0 0 1 0 1 1 1 1 0 0 1 0 0

Then the output of the gate 2 will be 1 0 0 0 0 0 0 0 0 0 0 0 0 0 0 0

There is no output during the latter half of the minor cycle as only the W and X parts of the instruction word are presented to the gate 2. The trigger 8 may be put on at T time in each minor cycle:

1 1 0 0 0 0 0 0 1 1 1 1 1 1 1 1 and is only put off by the output of the 2. A pulse at the beginning of N time appears on the channel 12, and is gated with the output of the trigger 8 at the gate 14 to put on the trigger 16, which stops the engine:

12 0 0 0 0 1 0 0 0 0 0 0 0 1 0 0 0
14 0 0 0 0 0 0 0 0 0 0 0 0 1 0 0 0
16 0 0 0 0 0 0 0 0 0 0 0 0 1 1 1 1

For stopping on the N and T part of the instruction word, the output of the not-equivalent gate (not shown) corresponding to the gate 2 will be 0 0 0 0 0 0 0 0 0 0 0 0 0 0 0 1 and the trigger fed by it will have an output such as 0 0 0 1 1 1 1 1 1 1 1 1 1 1 1 0 being on at the end of every X time and being put off only by pulses in the output of the not-equivalent gate. The pulse appearing on the channel 30 occurs at the end of each minor cycle:

0 0 0 0 0 0 0 1 0 0 0 0 0 0 0 1 and puts the trigger 32 on or off according to whether there is a signal or not on the channel 24:

0 0 0 0 0 0 0 1 1 1 1 1 1 1 1 0

During the minor cycle 01, the channel 34 carries a signal:

0 0 0 0 0 0 0 0 1 1 1 1 1 1 1 1 the pulse 42, occurring at the beginning of every minor cycle, puts the trigger 16 on or off according to whether there is a signal or not coming from the gate 36:

42 1 0 0 0 0 0 0 0 1 0 0 0 0 0 0 0
16 0 0 0 0 0 0 0 0 1 1 1 1 1 1 1 1 and the engine stops.

At the end of every minor cycle when there is no correspondence between the Stop Switches and the current instruction word, of course, the pulse on the channel 42 will put off the trigger 16. At the same time a pulse on the channel 10 is arranged to put on the trigger 8.

A very simple modification to the device described would make it usable in a parallel computing engine, or in any engine with parallel storage: the instruction word would have to be compared with the Stop Switches at a number of gates. The output corresponding to the output of the trigger 16 could be made to postpone the transfer, as before.

I claim:

1. An electrical digital computing engine constructed to use instruction words in accordance with which operations other than interrupt operations are performed and including a store for instruction words, means for setting up digits, comparing means connected to the said store for instruction words and the said means for setting up digits, for comparing the said digits with instruction digits set up in the said store, at least one of the said instruction digits being one of the digits specifying the operation other than interruption to be performed, and triggering means connected to the comparing means and to means for interrupting the programme when the numbers compared in the comparing means are the same, the arrangement being such that discrete interrupt digits are not required to interrupt the engine.

2. An electrical digital computing engine as claimed in claim 1 and including a minor cycle counter, a further comparing means connected to the said store for instruction words and the said minor cycle counter, triggering means connected to the comparing means and to means for interrupting the programme when the numbers compared in the comparing means are the same.

References Cited in the file of this patent

UNITED STATES PATENTS 2,907,524 Cali ---------------------- Oct. 6, 1959

OTHER REFERENCES

"A Functional Description of the EDVAC," University of Pennsylvania, Moore School of Electrical Engineering, Nov. 1, 1949, vol. I, pp. 2–20 to 2–23; vol. II, FIGS. 104–2LD–5 and 104–2LD–7.